United States Patent [19]

End et al.

[11] Patent Number: 5,126,395

[45] Date of Patent: Jun. 30, 1992

[54] PREPARATION OF STABLE WATER-IN-OIL EMULSIONS OF HYDROLYZED POLYMERS OF N-VINYLAMIDES

[75] Inventors: Lutz End, Mannheim; Walter Denzinger, Speyer; Michael Kroener, Mannheim; Norbert Sendhoff, Gruenstadt; Enrique Freudenberg, Schifferstadt; Friedrich Linhart, Heidelberg; Rolf Fikentscher, Ludwigshafen; Heinrich Hartmann, Limburgerhof, all of Fed. Rep. of Germany

[73] Assignee: BASF Aktiengesellschaft, Ludwigshafen, Fed. Rep. of Germany

[21] Appl. No.: 662,622

[22] Filed: Feb. 28, 1990

[30] Foreign Application Priority Data

Mar. 8, 1990 [DE] Fed. Rep. of Germany ....... 4007310

[51] Int. Cl.$^5$ ................................................ C08F 2/32
[52] U.S. Cl. .................................... 524/801; 524/800; 524/813
[58] Field of Search ....................... 524/813, 801

[56] References Cited

U.S. PATENT DOCUMENTS

| | | | |
|---|---|---|---|
| 4,421,602 | 12/1983 | Brunnmueller et al. | 162/168.2 |
| 4,490,557 | 12/1984 | Dowson | 564/159 |
| 4,623,699 | 11/1986 | Brunnmueller et al. | 525/355 |
| 4,774,285 | 9/1988 | Pfohl et al. | 525/60 |

FOREIGN PATENT DOCUMENTS

| | | |
|---|---|---|
| 0262577 | 4/1988 | European Pat. Off. . |
| 0264649 | 4/1988 | European Pat. Off. . |
| 1562417 | 3/1980 | United Kingdom . |

*Primary Examiner*—Joseph L. Schofer
*Assistant Examiner*—J. M. Reddick
*Attorney, Agent, or Firm*—Oblon, Spivak, McClelland, Maier & Neustadt

[57] ABSTRACT

Stable water-in-oil emulsions of a hydrolyzed polymer of an N-vinylamide of the formula

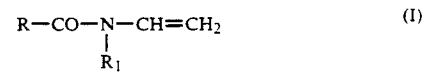

where R and $R^1$ are each H or $C_1$-$C_6$-alkyl, are prepared by polymerizing a compound of the formula I, alone or as a mixture with other monoethylenically unsaturated monomers, in the form of a water-in-oil emulsion to give a water-in-oil polymer emulsion, and then hydrolyzing the polymer, hydrolysis of the polymer in the form of the water-in-oil polymer emulsion being carried out in the presence of an acid or base, and additives in the form of antioxidants, reducing agents or aldehyde acceptors being added for stabilization.

4 Claims, No Drawings

PREPARATION OF STABLE WATER-IN-OIL EMULSIONS OF HYDROLYZED POLYMERS OF N-VINYLAMIDES

Partially hydrolyzed polymers of N-vinylformamide are disclosed in, for example, U.S. Pat. No. 4,421,602. The linear basic polymers described therein contain, as characteristic components, from 90 to 10 mol % of vinylamine units and from 10 to 90 mol % of N-vinylformamide units. They are prepared by polymerizing N-vinylformamide and hydrolyzing the polymers in dissolved form in the presence of acids or bases. Although the polymerization of the N-vinylformamide can also be carried out by a water-in-oil polymerization method, it is not possible to prepare stable water-in-oil emulsions of the hydrolyzed polymers from this by hydrolysis.

U.S. Pat. No. 4,623,699 discloses a process for the preparation of linear, basic polymer powders which contain polymerized vinylamine and N-vinylformamide units, in which process pulverulent polymers of N-vinylformamide are hydrolyzed with a gaseous hydrogen halide in the presence of not more than 5% by weight, based on the polymer used, of water. The hydrolysis of the polymer is preferably carried out in the absence of water. The particle size of the N-vinylformamide polymer is from 10 to 1,000 $\mu$m, preferably from 50 to 400 $\mu$m.

EP-A-0216387 discloses a process for the preparation of water-soluble copolymers containing polymerized vinylamine units by copolymerization of (a) from 95 to 10 mol % of N-vinylformamide with
(b) from 5 to 90 mol % of an ethylenically unsaturated monomer from the group consisting of vinyl acetate, vinyl propionate, $C_1$-$C_4$-alkyl vinyl ethers, N-vinylpyrrolidone, esters, nitriles and amides of acrylic acid and methacrylic acid, and subsequent hydrolysis of the copolymer, in which from 30 to 100 mol % of the formyl groups are eliminated from the copolymer. Although the polymers can be prepared as a water-in-oil emulsion, the hydrolysis is carried out in aqueous suspension or in an aqueous solution in the form of a paste.

EP-A-0231901 discloses the preparation of particularly high molecular weight polymers of N-vinylformamide, in which especially purified N-vinylformamide is subjected to polymerization in the form of a water-in-oil emulsion.

EP-A-0262577 and EP-A-0264649 likewise disclose the polymerization of N-vinylformamide and of substituted N-vinylamides in the form of a water-in-oil emulsion, but in these cases too the hydrolysis is carried out in aqueous solution.

Dilute aqueous solutions of high molecular weight polymers containing polymerized N-vinylamine units have a very high viscosity. For example, 5% strength aqueous solutions can no longer be pumped. Water-in-oil polymer emulsions which have a relatively low viscosity even with polymer contents of from 20 to 40% by weight and can thus be pumped are therefore suitable for the industrial use of hydrolyzed polymers of N-vinylamides.

British Patent 1,562,417 discloses a process for the preparation of water-in-oil dispersions of acrylamide polymers, which dispersions do not settle out; in this process, the polymerization is carried out in the presence of emulsifiers which are obtainable by reacting glycidyl ethers of $C_{10}$-$C_{22}$-fatty alcohols with dihydric to hexahydric alcohols of 2 to 6 carbon atoms or monoethers thereof which are derived from $C_{10}$-$C_{22}$-alcohols, in a molar ratio of glycidyl ether to alcohol of from 1:0.5 to 1:6. These emulsifiers can, if required, be reacted with alkylene oxides of 2 to 4 carbon atoms in a molar ratio of from 1:1 to 1:6.

The prior publication DE-A-3 842 820 discloses a process for the preparation of stable water-in-oil emulsions of hydrolyzed polymers of N-vinylamides, in which the polymers are hydrolyzed in the form of water-in-oil polymer emulsions in the presence of acids or bases and special emulsifiers. The water-in-oil polymer emulsions thus obtained are used as drainage aids, retention aids and flocculants in papermaking. If these water-in-oil polymer emulsions are stored for a relatively long time at 20° C. or higher temperatures, it is observed that the polymers lose activity and the water-in-oil polymer emulsion slowly becomes dark.

It is an object of the present invention to overcome the disadvantage of the decrease in activity on storage of the products and to provide a partially hydrolyzed poly-N-vinylformamide emulsion which remains colorless during storage.

We have found that this object is achieved, according to the invention, by a process for the preparation of stable water-in-oil emulsions of hydrolyzed polymers of N-vinylamides of the formula

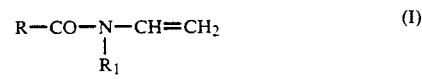

$$R-CO-N-CH=CH_2 \quad \quad (I)$$
$$\phantom{R-CO-N-}|$$
$$\phantom{R-CO-N-}R_1$$

where R and $R^1$ are each H or $C_1$-$C_6$-alkyl, by polymerizing a compound of the formula I, alone or as a mixture with other monoethylenically unsaturated monomers in the presence of a polymerization initiator and an emulsifier in the form of a water-in-oil emulsion to give a water-in-oil polymer emulsion, and then hydrolyzing the polymer of the water-in-oil polymer emulsion by the action of an acid or base, if from 0.01 to 20% by weight, based on the polymer, of an antioxidant, a reducing agent or an aldehyde acceptor are added to the water-in-oil polymer emulsion before, during or after the hydrolysis.

The water-in-oil polymers thus obtained are easy to handle and are used as retention aids, drainage aids and flocculants in papermaking.

The preparation of stable water-in-oil emulsions of hydrolyzed polymers of N-vinylamides is carried out in two process steps. In the first process step, a water-in-oil emulsion of a poly-N-vinylamide is prepared by subjecting an N-vinylamide of the formula

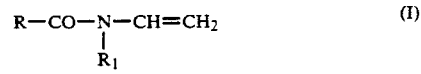

$$R-CO-N-CH=CH_2 \quad \quad (I)$$
$$\phantom{R-CO-N-}|$$
$$\phantom{R-CO-N-}R_1$$

where R and $R^1$ are each H or $C_1$-$C_6$-alkyl, to polymerization. Preferably used N-vinylamides are those in which R and $R^1$ are each H, ie. N-vinylformamide. Other suitable N-vinylamides of the formula I are, for example, N-vinyl-N-methylformamide, N-vinylacetamide and N-vinyl-N-methylacetamide.

The N-vinylamides can also be copolymerized together with other monoethylenically unsaturated water-soluble monomers which are copolymerizable therewith. Examples of such comonomers are monoethylenically unsaturated $C_3$–$C_5$-carboxylic acids and basic esters, nitriles and amides thereof. Examples of specific compounds of this type are acrylic acid, methacrylic acid, maleic acid, fumaric acid, crotonic acid, itaconic acid, acrylamide, methacrylamide, acrylamidoglycolic acid, acrylonitrile, methacrylonitrile, methyl acrylate, methyl methacrylate, dimethylaminoethyl acrylate, dimethylaminoethyl methacrylate, diethylaminoethyl acrylate, diethylaminoethyl methacrylate, dimethylaminopropylacrylamide, dimethylaminopropylmethacrylamide, sulfo-containing monomers, eg. vinylsulfonic acid, allylsulfonic acid, methallylsulfonic acid, styrenesulfonic acid, 3-sulfopropyl acrylate, 3-sulfopropyl methacrylate and acrylamidomethylpropanesulfonic acid, and monomers containing phosphonate groups, such as vinyl phosphonate, allyl phosphonate, methallyl phosphonate and acrylamidomethylpropanephosphonic acid. Hydroxyalkyl esters of acrylic acid and methacrylic acid, for example 2-hydroxyethyl acrylate, 2-hydroxypropyl acrylate, 3-hydroxypropyl acrylate and 2-hydroxyethyl methacrylate and hydroxypropyl methacrylate, are also suitable. This group of monomers also includes vinylglycol, N-vinylpyrrolidone, N-vinylcaprolactam, N-vinylimidazole, N-vinylmethylimidazole, N-vinyl-2-methylimidazoline, N-vinyl-2-ethylimidazoline, vinyl acetate, vinyl propionate, vinyl butyrate and mixtures of the stated monomers. Ethylenically unsaturated monomers which contain carboxyl, sulfo or phosphonyl groups are preferably used in the polymerization in partially or completely neutralized form. Alkali metal bases, such as sodium hydroxide solution or potassium hydroxide solution, ammonia or amines, eg. trimethylamine, ethanolamine or triethanolamine, are preferably used for neutralization. The basic monomers are preferably employed in the form of the salts with mineral acids, eg. hydrochloric acid or sulfuric acid, or in quaternized form (suitable quaternizing agents are, for example, dimethyl sulfate, diethyl sulfate, methyl chloride, ethyl chloride or benzyl chloride). For the preparation of water-in-oil polymers, the monomers are generally first dissolved in water. Comonomers which do not readily dissolve in water, for example acrylonitrile, methacrylonitrile or butyl methacrylate, are therefore used in the maximum amount corresponding to their solubility in water or in the aqueous monomer solution. Preferably, a water-in-oil polymer emulsion of a homopolymer of N-vinylformamide or of a copolymer of (a) from 95 to 10 mol % of N-vinylformamide and
(b) from 5 to 90 mol % of a monoethylenically unsaturated monomer from the group consisting of vinyl acetate, vinyl propionate, the $C_1$–$C_4$-alkyl vinyl ethers, N-vinylpyrrolidone, the esters, nitriles and amides of acrylic acid and methacrylic acid is initially prepared in the first stage of the novel process.

The copolymers should contain not less than 10 mol % of N-vinylformamide as polymerized units.

In the copolymerization, it is also possible concomitantly to use a further group of monomers (c) which dissolve in water and have two or more ethylenically unsaturated bonds in the molecule. These are crosslinking agents, for example methylenebisacrylamide, N,N'-divinylethyleneurea, N,N'-divinylpropyleneurea, ethylidenebis-3-vinylpyrrolidone and acrylates, methacrylates and maleates of dihydric or polyhydric alcohols, eg. ethylene glycol diacrylate and ethylene glycol dimethacrylate. Other suitable esters of this type are obtained, for example, in the esterification of polyhydric alcohols, eg. glycerol, pentaerythritol, glucose, fructose, sucrose, polyalkylene glycols having a molecular weight of from 400 to 2,000 or polyglycerols having a molecular weight of from 126 to 368, with acrylic acid, methacrylic acid or maleic acid, not less than 2 moles of one of the stated carboxylic acids or a mixture of the stated carboxylic acids being used per mole of the alcohol used. If water-soluble crosslinking agents are used, alone or as a mixture with other water-soluble monomers, in the polymerization of the N-vinylamides, the amount of crosslinking agents is from 100 to 20,000, preferably from 100 to 10,000, ppm, based on the total monomer mixture.

An aqueous monomer solution which has a pH of from 4 to 9, preferably from 5 to 8, is first prepared. In many cases, it is advisable to carry out the reaction additionally in the presence of a buffer, for example to add primary or secondary sodium phosphate to the aqueous phase. The concentration of the monomers in the aqueous solution is from 5 to 60, preferably from 10 to 50, % by weight.

The aqueous monomer phase is emulsified in a hydrophobic organic dispersion medium. Suitable virtually water-immiscible organic liquids are straight-chain or branched aliphatic hydrocarbons, such as pentane, hexane, octane, isooctane, decane, dodecane, liquid paraffins and liquid saturated hydrocarbon mixtures whose boiling points at atmospheric pressure (1,013 mbar) are from 120° to 350° C. In addition to straight-chain and branched aliphatic hydrocarbons, it is also possible to use saturated cyclic hydrocarbons, such as cyclohexane, methylcyclohexane, dimethylcyclohexane, ethylcyclohexane, cyclopentane, cycloheptane and cyclooctane. It is also possible to use mixtures of the stated hydrocarbons, such as those usually present in gasoline cuts. Such mixtures may also contain aromatic hydrocarbons. It is also possible to use, as a hydrophobic organic dispersion medium, pure aromatic hydrocarbons, such as toluene, xylenes, ethylbenzene, cumene and benzene, and chlorinated hydrocarbons, such as perchloroethylene, tetrachloroethylene, 1,1,1-trichloroethane and carbon tetrachloride. Mixtures of saturated hydrocarbons which contain not more than 20% by weight of naphthenes are preferably used. The saturated hydrocarbons consist mainly of n- and isoparaffins. The boiling range of such hydrocarbon mixtures is from 150° to 260° C. at 1,013 mbar (determined according to ASTMD 1078/86). The amount of the oil phase in the water-in-oil polymer emulsion is from 10 to 70, preferably from 20 to 50, % by weight.

The polymerization of the monomers is carried out in the presence of an initiator which forms free radicals under polymerization conditions, for example in the presence of peroxides, hydroperoxides, hydrogen peroxides, azo compounds or redox catalysts. Suitable free radical initiators are all compounds which have a half life of less than 3 hours at the particular polymerization temperature chosen. If polymerization is initially started at a relatively low temperature and completed at a higher temperature, it is advantageous to use two or more initiators which decompose at different temperatures, ie. initially to use an initiator which decomposes at a relatively low temperature for initiating the polymerization and then to carry out the main polymerization using an initiator which decomposes at a high temperature. Water-soluble or water-insoluble initiators or a mixture of water-soluble and water-insoluble initiators can be employed. The water-insoluble initiators are then soluble in the organic phase. For the temperature ranges shown below, for example, the initiators stated for the relevant range can be used.

Temperature: 40°–60° C.:

Acetylcyclohexanesulfonyl peroxide, diacetyl peroxydicarbonate, dicyclohexyl peroxydicarbonate, di-2-ethylhexyl peroxydicarbonate, tert-butyl perneodecanoate, 2,2'-azobis-(4-methoxy-2,4-dimethylvaleronitrile), 2,2'-azobis-(2-methyl-N-phenylpropionamidine) dihydrochloride and 2,2'-azobis-(2-methylpropionamidine) dihydrochloride Temperature: 60°–80° C.:

tert-Butyl perpivalate, dioctanoyl peroxide, dilauroyl peroxide and 2,2'-azobis-(2,4-dimethylvaleronitrile)

Temperature: 80°–100° C.:

Dibenzoyl peroxide, tert-butyl per-2-ethylhexanoate, tert-butyl permaleate, 2,2-azobisisobutyronitrile and dimethyl 2,2'-azobisisobutyrate Temperature: 100°–120° C.:

Bis-(tert-butylperoxy)-cyclohexane, tert-butylperoxyisopropylcarbonate and tert-butyl peracetate Temperature: 120°–140° C.:

2,2-Bis-(tert-butylperoxy)-butane, dicumyl peroxide, ditert-amyl peroxide and di-tert-butyl peroxide Temperature: >140° C.:

p-Menthane hydroperoxide, penane hydroperoxide, cumene hydroperoxide and tert-butyl hydroperoxide If salts of heavy metals, for example copper, cobalt, manganese, iron, nickel and chromium salts, or organic compounds, such as benzoin, dimethylaniline or ascorbic acid, are additionally used together with one or more of the abovementioned initiators, the half lives of the stated free radical initiators can be reduced. For example, tert-butyl hydroperoxide can be activated with the addition of 5 ppm of copper(II) acetylacetonate so that polymerization can be carried out at as low as 100° C. The reducing component of redox catalysts may also be formed, for example, by compounds such as sodium sulfite, sodium bisulfite, sodium formaldehyde sulfoxylate or hydrazine. From 100 to 10,000, preferably from 100 to 2,000, ppm, based on the monomers used in the polymerization, of a polymerization initiator or of a mixture of a plurality of polymerization initiators are used.

The polymerization may be carried out in the presence or absence of regulators. Examples of suitable regulators are mercapto compounds, such as mercaptoethanol, mercaptopropanol, mercaptobutanol, mercaptoacetic acid, mercaptopropionic acid, butyl mercaptan or dodecyl mercaptan, and also allyl compounds, such as allyl alcohol, aldehydes, such as acetaldehyde, propionaldehyde, n-butyraldehyde or isobutyraldehyde, and formic acid. If the polymerization is carried out in the presence of a regulator, from 0.05 to 5% by weight, based on the monomers used in the polymerization, of the regulator are required.

The water-in-oil polymerization is carried out by the process disclosed in U.S. Pat. No. 3,284,393. For this purpose, the aqueous monomer solution is emulsified in the hydrocarbon oil. To obtain a stable monomer emulsion, it is necessary to carry out emulsification of the aqueous monomer solution in the hydrocarbon oil in the presence of a water-in-oil emulsifier. Such products have an HLB of from 2 to 8. For the definition of the HLB, see W.C. Griffin, J. Soc. Cosmetic Chem. 5 (1954), 249. Examples of suitable water-in-oil emulsifiers are sorbitan monolaurate, sorbitan monopalmitate, sorbitan monostearate, sorbitan monooleate, glycerol monooleate, glycerol sorbitan fatty esters, ethoxylation products of glycerol sorbitan fatty esters and mannitol monooleate. More or less stable water-in-oil polymer emulsions can be prepared with the aid of the stated water-in-oil emulsifiers. The polymerization may additionally be carried out in the presence of wetting agents, giving water-in-oil polymer emulsions which are self-inverting when poured into water. The wetting agents are known to have an HLB of more than 8, preferably from 9 to 20. The use of wetting agents for inverting water-in-oil polymer emulsions when the latter are poured into water, in order to bring the polymer rapidly into solution, is disclosed in, for example, U.S. Pat. No. 3,624,019.

In a preferred embodiment of the novel process, the emulsifiers used are obtainable by (A) reacting $C_{10}$–$C_{22}$-fatty alcohols with epichlorohydrin in a molar ratio of from 1:0.5 to 1:1.5 to give glycidyl ethers, (B) reacting the glycidyl ethers with (1) saturated $C_2$–$C_6$-alcohols containing from 2 to 6 OH groups or (2) their monoethers with $C_{10}$–$C_{22}$-fatty alcohols, in a molar ratio of glycidyl ether to (1) or (2) of from 1:0.5 to 1:6 in the presence of an acid or base, and (C) alkoxylating the reaction products from (B) with one or more $C_2$–$C_4$-alkylene oxides in a molar ratio of from 1:1 to 1:6.

Emulsifiers of this type are disclosed in, for example, the abovementioned British Patent 1,562,417. For the preparation of these emulsifiers, a $C_{10}$–$C_{22}$-fatty alcohol is reacted with epichlorohydrin in the stated molar ratio in process stage (A) to give glycidyl ethers. Examples of suitable fatty alcohols are oleyl alcohol, stearyl alcohol, cetyl alcohol, myristyl alcohol, lauryl alcohol, tallow fatty alcohol and the long-chain alcohols of 10 to 22 carbon atoms which are obtainable by the oxo process.

In process stage (B), the glycidyl ethers obtained in (A) are reacted with saturated $C_2$–$C_6$-alcohols containing from 2 to 6 OH groups. Examples of suitable polyhydric alcohols of this type are ethylene glycol, diethylene glycol, dipropylene glycol, butane-1,4-diol, butane-1,2,4-triol, glycerol, trimethylolpropane, sorbitol, neopentylglycol and pentaerythritol. The stated polyhydric alcohols may also have an ether group which is derived from $C_{10}$–$C_{22}$-fatty alcohols. Suitable fatty alcohols of this type have already been mentioned above under (A). Suitable monoethers of saturated $C_2$–$C_6$ alcohols containing from 2 to 6 OH groups are, for example, 1-oleyloxypropane-2,3-diol and stearyloxypropane-2,3-diol. The glycidyl ethers are reacted with the two classes of compounds stated under (B) either alone or as a mixture, in a ratio of glycidyl ether to polyhydric alcohols or monoethers of polyhydric alcohols of from 1:0.5 to 1:6, in the presence of an acid or base.

The reaction products obtainable in this manner are then alkoxylated in reaction stage (C). Suitable alkylene oxides for this purpose are ethylene oxide, propylene oxide and butylene oxides. Ethylene oxide is preferably used. The use of mixtures of ethylene oxide and propylene oxide, ethylene oxide and butylene oxide or ethylene oxide, propylene oxide and butylene oxide for the alkoxylation of the reaction products (B) is possible. From 1 to 6 mol of alkylene oxides are used per mole of the compound according to (B).

For the preparation of the water-in-oil polymer emulsions of N-vinylamides, from 1 to 30% by weight, based on the monomers, of water-in-oil emulsifiers which have been described above are used. The polymerization of the water-in-oil monomer emulsion is carried out at from 20° to 150° C., preferably at atmospheric pressure, but may also be effected at reduced or superatmospheric pressure in order to adjust the temperature. During the polymerization, thorough mixing of the reactants is ensured. In industrial operation, stirred kettles which are equipped with an anchor stirrer are suitable for this purpose. The speed of the stirrer is from about 100 to 400 revolutions/minute. The polymerization is preferably carried out in such a way that the monomers undergo virtually complete polymerization. If necessary, the main polymerization may be followed by post-polymerization in which, for example, further amounts of peroxide or azo compounds are added to the reaction mixture. This gives water-in-oil polymer emulsions having a polymer content of from 10 to 50% by weight. If water-in-oil polymer emulsions having an even higher polymer content are required, the polymer content can be increased by removal of water and hydrocarbon oil by azeotropic distillation. This gives water-in-oil polymer emulsions having a polymer content of up to 70% by weight. Particularly stable water-in-oil polymer emulsions are obtained using emulsifiers which are obtainable by reaction according to the process stages (A), (B) and (C) described above. Polymers of N-vinylamides of the formula I and the copolymers have K values of from 20 to 300, preferably from 50 to 280. For most applications, K values of the polymers of from 100 to 250 are of particular interest (the K values were measured according to H. Fikentscher using 0.1% strength aqueous solutions, which are obtainable by dissolving 5 g of sodium chloride and 0.08 g of the adduct of 10 mol of ethylene oxide with 1 mol of isononylphenol in 94.92 g of distilled water. The measurements were carried out in each case at 25° C.).

In the second stage of the novel process, the polymers prepared in the first stage were hydrolyzed. The polymers contain not less than 10 mol % of characteristic units of the formula

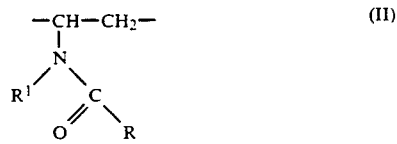

(II)

in which R and $R^1$ are each H or $C_1$-$C_6$-alkyl and which are converted by hydrolysis into units of the formula

(III)

where $R^1$ is H or $C_1$-$C_6$-alkyl. Depending on the reaction conditions during the hydrolysis, ie. on the amount of acid or base, based on the polymer to be hydrolyzed, and on the reaction temperature during the hydrolysis, either partial or complete hydrolysis of the units of the formula (II) results. The hydrolysis of the polymers is continued until from 2 to 100%, preferably from 4 to 80%, of the monomer units of the formula II contained in the polymers have been hydrolyzed. In order to carry out the hydrolysis, it is essential that the water-in-oil polymer emulsions prepared in the first process stage contain emulsifiers which can be prepared by reacting the above compounds described under (A), (B) and (C). These emulsifiers must be present in an amount of from 1 to 30, preferably from 2 to 20, % by weight, based on the polymers of the water-in-oil polymer emulsion, if the hydrolysis of the monomer units (II) contained in the polymers is carried out. In the preferred embodiment of the novel process, these emulsifiers are used at as early a stage as the preparation of the water-in-oil polymer emulsions. However, these emulsifiers can also be added to those water-in-oil emulsions of N-vinylamides of the formula I which have been prepared in the presence of other, conventional water-in-oil emulsifiers. The hydrolysis is carried out under reaction conditions under which water-in-oil polymer emulsions are usually unstable, ie. hydrolysis is effected by adding an acid or base to the water-in-oil polymer emulsions which have been prepared in the first process stage and contain the emulsifier obtainable by reaction of (A), (B) and (C), or to the concentrated water-in-oil polymer emulsions which likewise contain this emulsifier. Examples of acids which are suitable for the hydrolysis are mineral acids, such as hydrogen halides (gaseous or in aqueous solution), sulfuric acid, nitric acid or phosphoric acid (ortho- or meta-polyphosphoric acid), and organic acids, for example $C_1$-$C_5$-carboxylic acids, such as formic acid, acetic acid and propionic acid, or the aliphatic or aromatic sulfonic acids, such as methanesulfonic acid, benzenesulfonic acid or toluenesulfonic acid. Hydrochloric acid or sulfuric acid is preferably used for the hydrolysis. In the hydrolysis with acids, the pH is from 0 to 5. From 0.05 to 1.5, preferably from 0.4 to 1.2, equivalents of acid are required per equivalent of formyl groups in the polymer.

In the hydrolysis with bases, hydroxides of metals of the first and second main groups of the Periodic Table can be used; for example, lithium hydroxide, sodium hydroxide, potassium hydroxide, calcium hydroxide, strontium hydroxide and barium hydroxide are suitable. However, it is also possible to use ammonia and alkyl derivatives of ammonia, for example alkyl- or arylamines, such as triethylamine, monoethanolamine, diethanolamine, triethanolamine, morpholine or aniline. In the hydrolysis with bases, the pH is from 8 to 14. The bases can be used in a solid, liquid or , if necessary, gaseous state, diluted or undiluted. Bases preferably used for the hydrolysis are ammonia, sodium hydroxide solution or potassium hydroxide solution. The hydrolysis at acidic or alkaline pH is carried out at from 30° to 170° C., preferably from 50° to 120° C. It is complete after about 2-8, preferably 3-5, hours. After these reaction times, the degrees of hydrolysis of the units of the formula II in the polymer have reached from 2 to 100%, preferably from 4 to 80%. A procedure in which the bases or acids are added as an aqueous solution for the hydrolysis and in which the polymer concentration of the water-in-oil polymer emulsion is kept at from 20 to 50% by azeotropic distillation during the hydrolysis has proven particularly useful. The hydrolyzed water-in-oil polymer emulsion can also be concentrated after the end of the hydrolysis, for example to polymer contents of from 25 to 70% by weight, based on the total emulsion. After the hydrolysis, neutralization is generally carried out so that the pH of the hydrolyzed water-in-oil polymer emulsion is from 2 to 8, preferably from 3 to 7. The neutralization is required when it is intended to stop or retard the hydrolysis of partially hydrolyzed polymers. The viscosity of the hydrolyzed water-in-oil polymers is from 20 to 10,000, preferably from 50 to 5,000, mPa.s at 20° C. These water-in-oil polymer emulsions can thus be handled in a simple manner. For example, it is possible to pump them.

In order to prevent or substantially suppress, during storage, a decrease in the activity of the hydrolyzed emulsion polymers when used as drainage aids, retention aids and flocculants, and to obtain a water-in-oil polymer emulsion which has a substantially stable color, antioxidants, reducing agents or aldehyde acceptors are added to the water-in-oil polymer emulsions before, during or after the hydrolysis.

Antioxidants which generally act as free-radical acceptors or UV stabilizers are, for example, secondary aromatic amines, phenol, alkylphenols, thioethers, phosphites or mixtures of compounds of the stated classes of substances. Examples of suitable secondary aromatic amines are 4,4'-bis-(tert-butyl)-diphenylamine, 4,4'-bis-(phenylmethyl)-diphenylamine and mixtures thereof. Alkylphenols which are suitable antioxidants are, for example, 2,6-dimethyl-4-tert-butylphenol, 2,4,6-trimethylphenol, 2,4-di-tert-butyl-6-methylphenol and mixtures thereof. Examples of suitable thioethers are dialkyl 3,3'-thiodipropionate, poly-2,3-dimethylphenyl 1,4-disulfide, bis-(2-methyl-4-hydroxy-5-tert-butyl)sulfide, dibenzyl sulfide and dialkyl disulfides, eg. dioctadecyl disulfide.

Phosphites which are suitable antioxidants are, for example, trisnonylphenyl phosphite, di-(2,4-di-tert-butylphenyl) pentaerythritol diphosphite and diphenylene decyl phosphite.

Examples of suitable reducing agents are sodium borohydride, sodium cyanoborohydride and dithionites, such as sodium, potassium or zinc dithionite.

Examples of aldehyde acceptors are NH-containing compounds, such as urea, ethyleneurea, propyleneurea, melamine, guanidine, phenylbiguanidine or mixtures of the stated compounds. Other aldehyde acceptors are, for example, alkali metal bisulfites, such as sodium or potassium bisulfite.

Antioxidants, reducing agents and aldehyde acceptors are each used in amounts of from 0.01 to 20, preferably from 0.1 to 16, % by weight, based on the polymers of the water-in-oil polymer emulsion. These substances can be added before, during or after hydrolysis of the amide groups present in the polymers of the water-in-oil polymer emulsions.

For the use of the water-in-oil emulsions of hydrolyzed polymers, it is desirable for these products to be inverted rapidly when poured into water. As disclosed in U.S. Pat. No. 3,624,019 for emulsions of this type, they can be inverted by adding from 0.5 to 10%, preferably from 1 to 5%, of a wetting agent which has an HLB of not less than 9. Suitable surfactants of this type are, for example, the adducts of from 8 to 13 mol of ethylene oxide with $C_8$–$C_{12}$-alkylphenols or the adducts of from 5 to 30 mol of ethylene oxide with $C_{12}$–$C_{18}$-alcohols or $C_{10}$–$C_{12}$-alkylsulfonates. If water-in-oil polymer emulsions containing a wetting agent are poured into water, a phase inversion occurs and the polymer present in the emulsions dissolves rapidly in water.

The water-in-oil emulsions of hydrolyzed N-vinylformamide polymers, which emulsions are prepared according to the invention, are used, for example, as flocculants for the treatment of wastewaters from paper machines, as drainage aids and retention aids in papermaking, as dispersants and protective colloids for drilling muds, as assistants in flooding waters in the secondary and tertiary production of oil, as anticorrosion agents and as cement additives. The slightly crosslinked polymers are suitable as thickeners, for example for textile print pastes or in cleaner formulations. In all cases, very dilute aqueous solutions, which are prepared by their user by inversion of wetting agent-containing water-in-oil polymer emulsions of hydrolyzed N-vinylamide polymers, are required. The novel water-in-oil polymer emulsions do not settle out.

The K values were determined according to H. Fikentscher, Zellulosechemie, 13 (1932), 58–64 and 71–74; $K = k \cdot 10^3$. The K values of the copolymers were determined at a polymer concentration of 0.1% by weight in an aqueous sodium chloride solution which was prepared by dissolving 5 g of sodium chloride and 0.08 g of the adduct of 10 mol of ethylene oxide with 1 mol of isononylphenol in 94.92 g of distilled water. The measurements were carried out at 25° C.

The solids content of the water-in-oil polymer emulsions was determined by diluting 30 g of the emulsion with 10 g of a hydrocarbon mixture boiling within a range from 192° to 254° C. and stirring this mixture into 900 ml of acetone. The polymer was precipitated. It was filtered off quantitatively and the residue was taken up with 500 ml of acetone and filtered off again. The filter residue was then dried for 15 hours at 50° C. under reduced pressure, after which it was weighed. The calculation was then carried out using the following formula:

$$\text{Solids content in } \% = \frac{\text{Weight of residue} \times 100}{30}$$

In the Examples which follow, percentages are by weight, unless stated otherwise.

EXAMPLE 1

The following substances are placed, while stirring, in a 2 l polymerization container equipped with an anchor stirrer, a reflux condenser, a thermometer and a nitrogen inlet and outlet, in the stated order: 270.75 g of a hydrocarbon mixture boiling within a range from 192° to 254° C., 33 g of an emulsifier which was prepared by (A) reacting oleyl alcohol with epichlorohydrin in a molar ratio of 1:1 to give oleyl glycidyl ether, (B) reacting the oleyl glycidyl ether with glycerol in a molar ratio of 1:1 in the presence of $BF_3$/phosphoric acid at 80° C. and removing the catalyst with the aid of a basic ion exchanger and (C) ethoxylating the reaction product from (B) with 2 mol of ethylene oxide, 285.75 g of N-vinylformamide and a solution of 5 g of primary sodium phosphate in 491 g of distilled water. The pH of the mixture is 6.7. The content of the polymerization container is then stirred under a nitrogen atmosphere for 30 minutes at a stirrer speed of 400 rpm and thus emulsified, and the emulsion is heated. As soon as the reaction mixture has reached 40° C., a mixture of 0.427 g of 2,2,-azobis-(2,4-dimethylvaleronitrile) and 0.142 g of 2,2,-azobisisobutyronitrile in 10 ml of a hydrocarbon mixture is added and the temperature of the reaction mixture is then kept at 60°–65° C. for 2 hours. Thereafter, the reaction mixture is stirred for a further 2 hours at a stirrer speed of 400 rpm and at 75° C. It is then cooled to 50° C. The K value of the polymer of the water-in-oil polymer emulsion is 221. The solids content of the water-in-oil emulsion of the polymer is 26.1%.

For hydrolysis, 168.8 g of 70% strength sulfuric acid are added in the course of 30 minutes while stirring continuously, stirring is continued for 0.5 h and the reaction mixture is heated at 50° C. for 3 h. Under these conditions, 30% of the formamide groups of the polymer undergo hydrolysis. The reaction mixture is cooled to 20° C. and is brought to a pH of 5 by passing in 39.1 g of gaseous ammonia.

To render self-inverting the resulting water-in-oil emulsion of a hydrolyzed poly-N-vinylformamide which contains 30% of N-vinylamine units, 30 g of an adduct of 12 mol of ethylene oxide and 6 mol of propylene oxide with a $C_{13}/C_{15}$-oxo alcohol are added in the course of 30 minutes while stirring at a stirrer speed of 400 rpm. 6.5 g of sodium bisulfite, as a 40% strength aqueous solution, are then added while stirring. After the end of the addition, the reaction mixture is stirred for a further 2 hours. This gives 1,350 g of a slightly viscous, speck-free emulsion which can be readily diluted with water with rapid dissolution of the polymer. The polymer emulsion was still colorless after storage for three months at 25° C.

EXAMPLE 2

Example 1 is repeated, except that 45 g of dithionite in the form of an aqueous solution are added instead of sodium bisulfite. The polymer emulsion was still colorless after storage for three months at 25° C.

EXAMPLE 3

Example 1 is repeated, except that, instead of 6.5 g, 45 g of sodium bisulfite in the form of an aqueous solution are now added. The polymer emulsion was still colorless after storage for three months at 25° C.

EXAMPLE 4

The following substances are placed, while stirring, in a 2 l polymerization container equipped with an anchor stirrer, a reflux condenser, a thermometer and a nitrogen inlet and outlet, in the stated order: 270.75 g of a hydrocarbon mixture boiling within a range from 192° to 254° C., 33 g of an emulsifier which was prepared by
(A) reacting oleyl alcohol with epichlorohydrin in a molar ratio of 1:1 to give oleyl glycidyl ether,
(B) reacting the oleyl glycidyl ether with glycerol in a molar ratio of 1:1 in the presence of $BF_3$/phosphoric acid at 80° C. and removing the catalyst with the aid of a basic ion exchanger and
(C) ethoxylating the reaction product from (B) with 2 mol of ethylene oxide,
85.75 g of N-vinylformamide and a solution of 5 g of primary sodium phosphate in 491 g of distilled water. The pH of the mixture is 6.7. The content of the polymerization container is then stirred under a nitrogen atmosphere for 30 minutes at a stirrer speed of 400 rpm and thus emulsified, and the emulsion is heated. As soon as the reaction mixture has reached 30° C., a mixture of 0.427 g of 2,2'-azobis-(4-methoxy-2,4-dimethylvaleronitrile) and 0.142 g of 2,2'-azobis-2,4-dimethylvaleronitrile in 10 ml of a hydrocarbon mixture is added and the temperature of the reaction mixture is then kept at 30° C. for 15 hours. Thereafter, the reaction mixture is stirred for a further 4 hours at a stirrer speed of 400 rpm and 50° C. The K value of the polymer of the water-in-oil polymer emulsion is 239. The solids content of the water-in-oil emulsion polymer is 26.1%.

For hydrolysis, 168.8 g of 70% strength sulfuric acid are added in the course of 30 minutes while stirring continuously, stirring is continued for 0.5 h and the reaction mixture is heated at 50° C. for 3 h. Under these conditions, 30% of the formamide groups of the polymer undergo hydrolysis. The reaction mixture is cooled to 20° C. and is brought to a pH of 5 by passing in 39.1 g of gaseous ammonia.

To render self-inverting the resulting water-in-oil emulsion of a hydrolyzed poly-N-vinylformamide which contains 30% of N-vinylamine units, 30 g of an adduct of 12 mol of ethylene oxide and 6 mol of propylene oxide with a $C_{13}/C_{15}$-oxo alcohol are added in the course of 30 minutes while stirring at a stirrer speed of 400 rpm. 6.5 g of sodium bisulfite, as a 40% strength aqueous solution, are then added while stirring. After the end of the addition, the reaction mixture is stirred for a further 2 hours. This gives 1,350 g of a slightly viscous, speck-free emulsion which can be readily diluted with water with rapid dissolution of the polymer. The polymer emulsion was still colorless after storage for three months at 25° C.

COMPARATIVE EXAMPLE according to DE-A-3 842 820

The following substances are placed, while stirring, in a 2 l polymerization container equipped with an anchor stirrer, a reflux condenser, a thermometer and a nitrogen inlet and outlet, in the stated order: 290 g of a hydrocarbon mixture boiling within a range from 192° to 254° C., 30.25 g of the emulsifier which was prepared by
(A) reacting oleyl alcohol with epichlorohydrin in a molar ratio of 1:1 to give oleyl glycidyl ether,
(B) reacting the oleyl glycidyl ether with glycerol in a molar ratio of 1:1 in the presence of $BF_3$/phosphoric acid at 80° C. and removing the catalyst with the aid of a basic ion exchanger and
(C) ethoxylating the reaction product from (B) with 2 mol of ethylene oxide,
190.5 g of freshly distilled N-vinylformamide and a solution of 3.8 g of primary sodium phosphate in 371 g of distilled water. The pH of the mixture is 6.5. The content of the container is then emulsified for 30 minutes at a stirrer speed of 400 rpm under a nitrogen atmosphere. The mixture is then heated at a stirrer speed of 400 rpm. After 40° C. has been reached, 0.285 g of 2,2'-azobis-(2,4-dimethylvaleronitrile), dissolved in 5 g of acetone, is added and the mixture is heated to 60° C. The temperature is maintained for 2 hours at 60°–65° C., after which a solution of 0.055 g of 2,2'-azobis-(2,4-dimethylvaleronitrile), dissolved in 3 g of acetone, is added and the reaction mixture is then heated for a further 2 hours at 75° C. After this time, a thin speck-free and coagulate-free emulsion having a solids content of 21.7% is obtained; it is cooled to 50° C. and 34.3 g of gaseous hydrogen chloride are passed into it in the course of 0.5 hour to hydrolyze the poly-N-vinylformamide. The hydrolysis is terminated after 5 hours at 50° C. After this time, 30% of the formamide groups of the homopolymer of N-vinylformamide have been converted into amine groups. The reaction mixture is then cooled to 20° C. and is brought to pH 5 by passing in 15.5 g of gaseous ammonia. Thereafter, 30 g of the adduct of 10 mol of ethylene oxide with 1 mol of isononylphenol are added in the course of half an hour while stirring thoroughly, and the mixture is stirred for a further 2 hours. This gives 974 g of stable water-in-oil emulsion of a poly-N-vinylformamide having a degree of hydrolysis of 30%. This emulsion has a low viscosity and is smooth and speck-free and coagulate-free. The K value of the polymer before hydrolysis is 220 and the viscosity is 800 mPa.s. The surfactant-free and the surfactant-containing water-in-oil polymer emulsions have a long shelf life. The surfactant-containing one undergoes inversion when poured into water, the polymer dissolving rapidly in water. After a storage time of 3 months, the polymer emulsion has assumed a brownish color.

Application Examples for determining the efficiency of the polymer emulsions obtained according to the Examples and the Comparative Example (a) Drainage effect A paper stock is prepared from 100 parts of wood-containing material and 10 parts of kaolin, and the consistency is brought to 2 g/l. The pH of the stock is 7.2. 0.06%, based on the dry fiber, of the active ingredient of the retention and drainage aids is added in each case to one part of this paper stock and the mixture is tested for drainage speed in a Schopper-Riegler apparatus. The retention and drainage aids are stored for 3 months at 5° C., 25° C. and 40° C. and the test is repeated as described above. The results are summarized in Table 1.

TABLE 1

| Retention and drainage aids | Drainage time (sec) | Drainage time (sec) after storage at | | |
|---|---|---|---|---|
| | | 5° C. | 25° C. | 40° C. |
| Comparative Example | 30.0 | 30.6 | 38.9 | 47.8 |
| Example 1 | 29.7 | 28.0 | 30.0 | 34.9 | described above. The results are summarized in Table 2.

TABLE 2

| Retention aid | Basis weight g/m² | Filler content % | Basis weight [g/m²] in each case after storage of the polymer emulsion for three months at | | | Filler content % | | |
|---|---|---|---|---|---|---|---|---|
| | | | 5° C. | 25° C. | 40° C. | 5° C. | 25° C. | 40° C. |
| Comparative Example | 75.4 | 15.6 | 71.8 | 71.2 | 70.7 | 15.5 | 14.9 | 14.4 |
| Example 1 | 75.6 | 16.5 | 71.1 | 72.4 | 70.8 | 16.0 | 16.0 | 15.8 |

It is clear that the filler content of the sheet decreases after storage of the retention aid for 3 months only when the retention aid is stored at elevated temperatures.

The test described under (b) is also carried out using the polymer emulsions which were obtained according to Examples 2 and 3 and the Comparative Example. The emulsions are stored in each case for 3 months at 5° C. and 40° C.

The results of the retention test are summarized in Table 3.

TABLE 3

| Retention aid | Basis weight g/m² | Filler content % | Basis weight [g/m²] after storage at | | Filler content % after storage | |
|---|---|---|---|---|---|---|
| | | | 5° C. | 40° C. | 5° C. | 40° C. |
| Comparative Example | 71.0 | 15.1 | 70.8 | 68.3 | 16.2 | 13.3 |
| Example 2 | 70.0 | 14.3 | 72.2 | 71.7 | 15.5 | 14.2 |
| Example 3 | 70.7 | 14.6 | 73.8 | 70.9 | 14.6 | 14.8 |

It is clear that the loss of activity in the case of the stablized retention and drainage aids is not as pronounced as in the case of the nonstabilized sample from the Comparative Example.

The test is carried out as described under (b) except that the retention and drainage aids according to Example 4 and the Comparative Example are stored for 2 months at 5° C. and 40° C. and are used in an amount of 0.04%, based on dry fiber, of the active ingredient of the retention and drainage aids.

The results are summarized in Table 4.

TABLE 4

| Retention and drainage aids | Basis weight g/m² | Filler content % | Basis weight [g/m²] in each case after storage of the polymer emulsion for three months at | | Filler content % | |
|---|---|---|---|---|---|---|
| | | | 5° C. | 40° C. | 5° C. | 40° C. |
| Comparative Example | 54.6 | 71 | 38.0 | — | 93 | — |
| Example 4 | 55.5 | 73 | 36.8 | 35.0 | 93 | 93 |

The Examples show that a significant deterioration in the drainage effect occurs only after storage at 40° C., when the stabilized sample from Example 1 is used.

(b) Retention effect

The retention effect is tested using a paper stock consisting of 80 parts of bleached sulfite pulp and 20 parts of kaolin. The consistency is brought to 2 g/l. The pH of the stock is 7.0. 0.04%, based on the dry fiber, of the active ingredient of the retention aids is added to this stock. To determine the retention effect, sheets are formed in each case with the aid of the Rapid-Köthen apparatus and their basis weight and filler content are determined. The retention aids are stored for 3 months at 5° C., 25° C. and 40° C. and the test is repeated as It is clear that stabilization is possible here even after storage of the retention and drainage aid at 40° C.

We claim:

1. A process for the preparation of a stable water-in-oil emulsion of a hydrolyzed polymer of an N-vinylamide of the formula

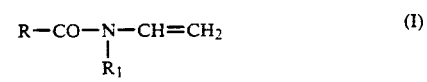

where R and R¹ are each H or $C_1$-$C_6$-alkyl, wherein a compound of the formula I, alone or as a mixture with other monoethylenically unsaturated monomers, is polymerized in the presence of a polymerization initiator and an emulsifier in the form of a water-in-oil emulsion to give a water-in-oil polymer emulsion, and the polymer is then hydrolyzed by the action of an acid or base, from 0.01 to 20% by weight, based on the polymer, of an antioxidant, a reducing agent or an aldehyde acceptor being added to the water-in-oil polymer emulsion before, during or after the hydrolysis.

2. A process as claimed in claim 1, wherein the antioxidant used is a secondary aromatic amine, an alkylphenol, a hydroquinone, a thioether, a phosphite or a mixture thereof.

3. A process as claimed in claim 1, wherein the reducing agent used is sodium borohydride, sodium cyanoborohydride, an alkali metal bisulfite or an alkali metal dithionite.

4. A process as claimed in claim 1, wherein the aldehyde acceptor used is urea, ethyleneurea, propyleneurea, melamine, guanidine, phenylbiguanidine or a mixture thereof.

* * * * *